Feb. 15, 1949.  H. D. SIMONS  2,461,848
METHOD OF TESTING CAMERA SYNCHRONIZERS
Original Filed Nov. 20, 1944
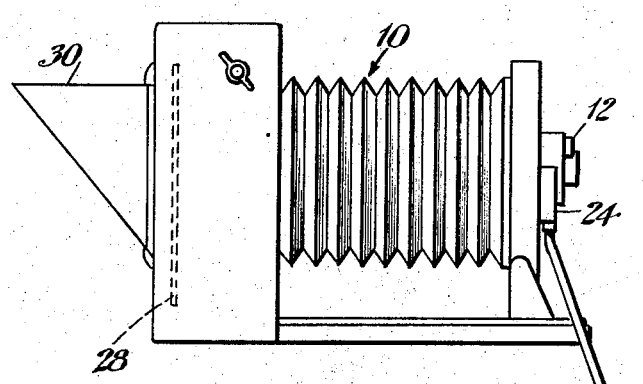
Fig. 1.
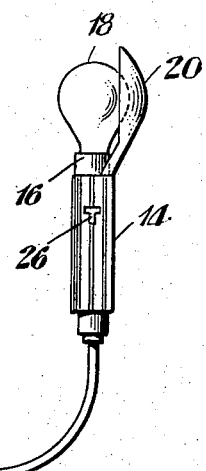
Fig. 2.
Fig. 3.
Fig. 4.
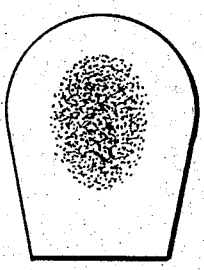
Fig. 5.
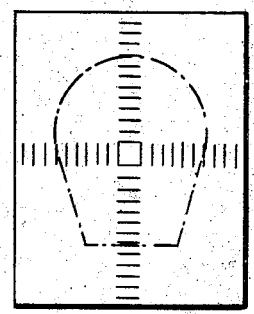
INVENTOR
HARRY DAVIS SIMONS
BY
Pennie, Davis, Marvin and Edmonds
ATTORNEYS Patented Feb. 15, 1949

2,461,848

UNITED STATES PATENT OFFICE 2,461,848

METHOD OF TESTING CAMERA SYNCHRONIZERS

Harry Davis Simons, Kearney, N. J.

Original application November 20, 1944, Serial No. 564,226. Divided and this application May 11, 1945, Serial No. 593,254

12 Claims. (Cl. 250—71)

This invention relates to the synchronization of the ignition of a photoflash bulb or the like with the operation of the shutter of a camera with which such flash bulb is associated and is particularly concerned with a system for testing the degree of synchronization between the flash bulb-igniting mechanism and the shutter. The present application is a division of my prior copending application Serial No. 564,226, filed November 20, 1944, Patent No. 2,428,818, granted October 14, 1947.

The use of devices to synchronize the opening of the shutter of a camera with the ignition of a photoflash bulb or the like attached thereto is well known. Such devices operate to ignite the flash bulb and to open the shutter in a timed sequence that takes into account the difference in the lag periods of the flash bulb and the shutter. It is essential, however, that such a synchronizing device be so adjusted that the shutter is completely open at the instant of maximum brightness or peak illumination of the flash produced by the flash bulb in order to obtain the clearest definition of the resulting image.

Because the speed of opening of the shutter frequently varies with each type of shutter or even with the setting or condition of the shutter, it is not only customary to initially adjust such a synchronizer to the particular camera to which it is to be attached, but it is also often necessary subsequently to readjust it. Such readjustment of the synchronizer may be required, for example, particularly where the camera is subject to shocks and other abuse as in commercial and newspaper photography.

Heretofore many methods, systems, and devices have been proposed for adjusting the synchronizer attachment for a camera and for testing the resulting adjustment to determine whether or not the desired degree of synchronization has been achieved. Such prior methods, systems, and devices, however, have usually involved complicated mechanical and electrical arrangements so that their use has not been altogether satisfactory. Moreover, many of these previously suggested proposals have not been adapted to portable use or have not been designed so that the necessary adjustments to attain absolute synchronization can be made "on location" in a matter of a few minutes or so.

The present invention is directed to an improved method for testing the degree of synchronization between the mechanism for igniting a photoflash bulb, for example, and the shutter of a camera with which it is associated. The present method includes the step of igniting the photoflash bulb and directing the resulting flash therefrom through the simultaneously opened shutter of the camera onto a photosensitive substance so that a focussed image of the flash and the flash bulb is made thereon. The particular photosensitive substance utilized for this purpose in accordance with the invention is one that is substantially instantly responsive to the light from the flash and is of the "printing out" type, viz., one that requires no processing whatever, but does not permanently retain the resulting image produced thereon. The image of the flash should be clearly and distinctly retained, however, for a period sufficiently long to permit the operator to examine the image and to determine therefrom whether or not the photoflash bulb-igniting mechanism and the camera shutter are properly synchronized. Advantageously, such photosensitive substance may comprise a suitable phosphorescent compound or mixture, which may be coated on a sheet material for greater convenience in use. Such sheet material (for convenience referred to herein as a plate) may be flexible or inflexible and may be opaque or translucent in accordance with the type of camera being tested, the nature of the photosensitive substance employed for the test, and the manner in which the adjustment of the synchronizer is to be tested.

A great advantage of the invention resides in the fact that one can superimpose successive images on the same plate for purposes of comparison and yet can examine the image or images after each exposure. Furthermore, the same plate may be used over and over again in the same or different tests.

The improved synchronization-testing method of the invention will now be described in detail in connection with the accompanying drawing, in which:

Fig. 1 illustrates a camera and its synchronizer attachment ready to be tested in accordance with the present invention;

Figs. 2 to 4 represent images obtained under different degrees of synchronization the outlines being those of the glass envelopes of the photoflash bulbs and the darkened areas representing the illuminated portions or bright spots caused by the ignited flash material; and Fig. 5 shows a plate coated with an appropriate photosensitive substance and provided with crosshatching to permit more rapid comparison of successive images made thereon.

In Fig. 1 I have shown a camera 10 arranged to be tested for the degree of synchronization between its shutter 12 and its accompanying photoflash-producing mechanism. This latter mechanism includes the battery case 14 (customarily mounted on the side of the camera) provided with the socket 16, in which the photoflash bulb 18 is inserted, and with the usual reflector 20. The battery case is connected by means of the flexible cable or electric cord 22 to a synchronizer 24 (conventionally shown), which is mounted on the side of the camera 10 and which actuates the shutter 12 in any suitable, well-known manner.

Operation of the switch 26 on the battery case 14 closes the circuit and simultaneously ignites the flash bulb 18 and operates the shutter 12 in timed sequence in accordance with the respective lag periods of the flash bulb and the shutter. One or more flashlight batteries (not shown) contained in the battery case 14 supply the necessary electrical energy to ignite the flash bulb and to actuate the synchronizer 24.

It frequently happens that it becomes necessary or desirable to test the adjustment of the synchronizer or to readjust its setting. In such event, in accordance with my invention, battery case 14 with a flash bulb in place is detached from the camera and placed a short distance in front of the shutter 12 in the position shown in Fig. 1. Although the reflector 20 may be left in place, better results may be obtained without it. The camera is then focussed by its usual means, and the lens is suitably stopped down so that a clear, focussed image of the flash bulb appears on the ground glass plate therein. Then, a special photosensitive plate 28 (later to be described) is inserted in place of the usual photographic plate or film at the focal plane of the lens. When the apparatus has been so rearranged, the switch 26 is closed, and an exposure of the resulting flash from the flash bulb 18 is made on the special photosensitive plate 28 as the shutter 12 is simultaneously opened.

As a typical example illustrative of the invention, a satisfactory full-size image was obtained by using a No. 2 "Wabash" photoflash bulb placed 12 inches in front of a camera equipped with an f4.5 lens having a 6-inch focal length, the lens being stopped down to f16 and the shutter being set for 1/100 second. It is to be understood, of course, that the application of the invention is not limited to any particular type of shutter or lens.

The special plate 28 is coated with a photosensitive surface which is activated instantaneously by light to produce the desired image and which does not require any processing whatever but which does not retain such image either permanently or even for an extended period of time. The particular photosensitive substance utilized for the purposes of the present invention must, accordingly, have a very fast pick-up or absorption characteristic, i. e., it must be substantially instantaneously responsive to activation by light, and it must produce a distinct image of the flash produced by the ignition of the flash bulb, as seen through the shutter. Such instantaneous activation by light of the photosensitive substance used is essential in view of the fact that the flash of light produced by such a flash bulb lasts only about 1/50 of a second and that a high-speed shutter may remain open for as short a time as 1/200 second. Such photosensitive substance must, moreover, also have a gradual decay characteristic, i. e., it must retain the image sufficiently long so that the resulting exposure is still clearly visible or discernible for a period of the order of several minutes or long enough to permit adequate inspection of the image and measurement of the illuminated area, if desired. Obviously, the photosensitive plate should be protected from bright light until it is placed in position in the camera.

An exposure of the ignition of the flash bulb attached to the particular camera undergoing testing having been made, the resulting image is now examined in order to determine whether the adjustment of the synchronizer 24 is correct. The image will usually be so brilliant that it may be clearly seen, even in subdued daylight, if the plate is held in deep shadow such as inside of one's coat or beneath a focusing cloth. If the resulting image appears similar or substantially similar to that shown in Fig. 3, (i. e., the glass envelope is substantially filled by an evenly right area) then the synchronizer is properly adjusted, and no further testing is necessary. Since the image or picture on the special photographic plate 28 is not permanent, this plate may then be stored in the dark and utilized again whenever it is desired to subject the camera to another synchronization test.

If the resulting exposure produces an image similar to that shown in Fig. 2, (i. e., the bright area is somewhat smaller than the envelope) then the camera shutter is "fast," viz., it is completely open before the peak illumination of the flash is reached. If, on the other hand, the resulting image is similar to that shown in Fig. 4, (i. e., the bright area is of a mottled or cloudy character and may appear smaller than the envelope) then the camera shutter is "slow," viz., it is completely open after the peak illumination of the flash has been passed. In either case, further adjustment of the synchronizer 24 in the proper direction or sense is necessary.

When the indicated adjustment of the synchronizer has been made, the same plate 28 is reinserted in the camera, another flash bulb is inserted in the socket 16, the shutter is reset if required, the switch 26 is again closed, and an exposure of the resulting flash is made on the photosensitive substance. This second exposure will thus superimpose a second image on the first image. Alternatively, the second exposure may be made on another similar photosensitive plate. Regardless of which procedure is used, the two successive exposures are compared with each other to determine whether any further adjustment is required. The use of a single photographic plate facilitates this determination because a glance at the superimposed images will indicate whether the second image of the flash is larger or smaller than the first. If it is larger or more closely resembles Fig. 3, the adjustment was made in the right manner. If one or more additional adjustments are necessary, they are made, and the same testing procedure followed until the desired degree of synchronization is obtained. When any such series of tests or successive exposures is made, the photoflash bulb is, of course, always positioned at the same distance from the shutter.

The photosensitive substance may conveniently be coated on any suitable sheet material such as paper, metal, plastic, Celluloid, cellulose acetate, glass, and the like. The coating should, of course, be uniformly applied to the sheet material so that low and high spots do not appear in the exposure made thereon. Where such substance is coated on a translucent material such as glass or a transparent plastic, for example, the image obtained during the test may be examined without taking the special photographic plate from the camera provided the camera has a removable back. Otherwise, of course, the special photographic plate must be removed from the camera and then examined. The photosensitive substance may also be coated on both sides of the sheet material where it is desired to obtain successive exposures on opposite sides of the special photographic plate. In this case the backing material is usually opaque.

No difficulty is encountered in producing a plurality of exposures on the same plate according to this invention inasmuch as the brilliancy of the successive images is substantially the same provided the synchronization adjustment is not changed too rapidly. Accordingly, the area of each image is the principal measure of the degree of synchronization, and hence cross-hatching may advantageously be provided on the plate to assist in the rapid determination of the degree of synchronization by comparison of areas. This cross-hatching may be applied directly to the special photographic plate as shown in Fig. 5, or it may be applied to a transparent or translucent protective material covering the coating of photosensitive substance.

No special equipment such as a dark room, chemical film-developer, or the like, is required in the present system for testing the degree of synchronization; for the image obtained on the photosensitive substances utilized in accordance with the invention can be immediately examined. It is only necessary that, for use with the usual flash bulb, the special photosensitive plate be not subjected just before or after exposure to the action of too high an intensity of actinic light; for otherwise, the entire sensitized surface may be activated thereby, and the effect of the desired exposure is destroyed. As above stated, the image may be examined in any appropriate shaded area away from direct sunlight, for example; and where a translucent special sensitive plate is used, the back 30 of the camera may provide the necessary shade. Otherwise, a focusing cloth may be used.

Various phosphorescent or fluorescent substances may be employed as the photosensitive coating for the plate 28, and zinc sulfide-type phosphors have been found suitable for this purpose. A suitable photosensitive plate may comprise a paper or plastic sheet backing material coated with a zinc sulfide phosphor that is substantially instantly responsive to activation by light and retains the resulting image with clarity for a period of several minutes or so. As is well known, phosphorescent zinc sulfide is highly refined, its color depending on the presence of traces of other metals, zinc-cadmium sulfide phosphor being yellow to orange-red, copper-activated zinc sulfide phosphor being green to yellow-green, and zinc-silver sulfide phosphor being blue in color. Of these several zinc sulfides, the zinc-copper sulfide phosphor appears to be preferable under most circumstances.

Other types of phosphorescent substances such as certain silicates, for example, zinc silicate, various uranyl salts, barium platinocyanides, calcium and strontium sulfides, certain fluorescent dyes, and the like may be employed as the photosensitive substance. Inasmuch as not all of these substances respond to the same degree to activation by light of a given wave length, it is possible to select the photosensitive substance to fit the light conditions for any particular situation. Whatever substance is used, it must be activated instantly by light, it must not produce a permanent image, it must require no processing or developing, and it must retain the image for a period sufficiently long to permit a determination of the degree of synchronization to be made without undue delay.

The selection of the particular photosensitive substance to be used is also governed by the period from the time the exposure is made until the time the resulting image is to be examined. Where such time period is relatively short as of the order of a few minutes, a photosensitive substance having a relatively rapid decay characteristic may be used. Where such time period is longer, a substance having a more gradual decay characteristic is indicated. Accordingly, the special photosensitive plate may be opaque and may be coated on its two surfaces with photosensitive substances having different light-sensitive or different decay characteristics or both for use under different circumstances.

An infra-red light source may also be used to conduct the test. In such case the entire surface of the photosensitive plate is activated by ordinary visible light including the shorter wave lengths, prior to the test, and the plate is then exposed to the infra-red flash light source. Inasmuch as the infra-red light has a quenching action on the phosphorescence of a light-sensitive phosphor, an image the reverse or negative of that produced by the ordinary procedure is obtained. Hence, in this case the light and dark areas within the envelope would appear in the relations (negative) illustrated in Figs. 2 to 4, incusive, and not reversed as in the usual case previously explained. Otherwise, the principle and method of procedure are the same as before.

The testing procedure of the present invention is particularly advantageous in newspaper photography and the like, for it permits the photographer to check the adjustment of his synchronizer "on location" in a matter of a few minutes or less without the use of any complicated or extraneous equipment and without returning to a laboratory to process or develop the exposure.

It will be appreciated that the application of the present invention is adapted to cameras of types other than that shown in Fig. 1 without departing from the scope of the invention. For example, with a camera provided with a synchronizer that works only when the flash-bulb holder is attached directly to the camera, such synchronizer can be tested by facing the camera towards a mirror, properly focusing the camera, igniting the flash-bulb, and examining the resulting image of the flash.

I claim:

1. In a method of determining the degree of synchronization between the shutter of a camera and a photoflash-producing mechanism operatively associated therewith, said mechanism synchronizing the ignition of a photoflash bulb with the opening of the shutter, the steps which comprise placing said bulb in front of said camera, focusing the image of said bulb on the focal plane of said camera, actuating said mechanism to ignite the flash bulb and substantially simultaneously to open the shutter, directing the light from the flash bulb through the open shutter onto said focal plane, and substantially instantaneously forming at said focal plane a slowly decaying, focused, self-luminous image of the flash illuminated bulb, whereby to enable the determination, by inspection of said last named image, of the degree of synchronization between said shutter and said mechanism.

2. The method of determining the sense and degree of the synchronization between the shutter of a camera and a photoflash-producing mechanism operatively associated therewith, said mechanism synchronizing the ignition of a photoflash bulb with the opening of the shutter, which comprises placing said bulb in front of said camera, focusing the image of said bulb on the focal plane of said camera, positioning in the focal plane of said camera a plate comprising a photosensitive substance of the printing-out type substantially instantaneously activated by light and having a slow decay characteristic, actuating said mechanism to ignite the flash bulb and substantially simultaneously to open the shutter, directing the light from the flash bulb through the open shutter onto said substance, and substantially instantaneously producing by said light on said plate a slowly decaying focused outline image of the flash-illuminated bulb, adjusting said mechanism, in accordance with the extent to which the illuminated area within the outline of the bulb is smaller than said outline, inserting another photoflash bulb in said mechanism and actuating the mechanism again to superimpose the focused image of said second ignited flash bulb upon the image of said first flash bulb to enable the determination, by comparison of the areas of said superimposed images, of the sense of said adjustment and the degree of synchronization thereby obtained.

3. In a method for testing the synchronization between a camera shutter and a photoflash-producing mechanism operatively associated therewith to synchronize the ignition of a photoflash bulb with the opening of the shutter, said shutter being fitted with a lens, the steps which comprise, positioning the photoflash bulb in such relation to said lens and shutter that light from said bulb will pass through said lens and shutter, focusing on the focal plane of said camera an image of said bulb, positioning in the focal plane of said camera sheet material comprising a phosphorescent photosensitive substance of the type substantially instantaneously activated by light and having a slow decay characteristic, actuating said mechanism to ignite said photoflash bulb and to open said shutter, and directing the light from the ignited photoflash bulb through said lens onto said photosensitive substance to activate said substance so as substantially instantaneously to produce thereon a non-permanent focused image of the activated area and the envelope of the ignited photoflash bulb, to enable by inspection of said image the immediate determination of the character and extent of the activated area within said envelope, thereby to determine the sense and degree of synchronization between said shutter and said mechanism.

4. In a method for determining the degree of synchronization between a photographic shutter and a photoflash-producing mechanism operatively associated therewith, said shutter being fitted with a lens and said mechanism synchronizing the ignition of a photoflash bulb with the opening of the shutter, the steps which comprise, illuminating said bulb by light external thereto, focusing an image of said bulb on the focal plane of said lens, positioning in said focal plane a plate comprising an unexposed photosensitive substance of the printing-out type substantially instantaneously activated by light and having a slow decay characteristic, actuating said mechanism to ignite the flash bulb and substantially simultaneously to open the shutter, directing light from said ignited flash bulb through the open shutter onto said photosensitive substance, and substantially instantaneously forming thereon by said light a nonpermanent focused image which represents an illuminated area within an outline of said bulb, whereby to enable the determination, by comparison of said area and said outline, of the degree of synchronization between said shutter and said mechanism.

5. In a method for determining the degree of synchronization between a photographic shutter and a photoflash-producing mechanism operatively associated therewith, said shutter being fitted with a lens and said mechanism synchronizing the ignition of a photoflash bulb with the opening of the shutter, the steps which comprise, focusing an image of said bulb on the focal plane of said lens, actuating said mechanism to ignite the flash bulb and substantially simultaneously to open the shutter, directing light from said ignited flash bulb through the open shutter onto said focal plane, and substantially instantaneously forming at said focal plane by said light a slowly decaying, focused image of the flash-illuminated area of said bulb within an outline of said bulb, whereby to enable the determination, by comparison of said area and said outline, of the degree of synchronization between said shutter and said mechanism.

6. In a method for synchronizing a photographic shutter and a photoflash-producing mechanism operatively associated therewith, said shutter being fitted with a lens and said mechanism synchronizing the ignition of a photoflash bulb with the opening of the shutter, the steps which comprise, focusing an image of said bulb on the focal plane of said lens, actuating said mechanism to ignite the flash bulb and substantially simultaneously to open the shutter, directing light from said ignited flash bulb through the open shutter onto said focal plane, energizing with said light a phosphor area located at said focal plane so as substantially instantaneously to produce thereon a self-luminous, slowly decaying, focused image of the flash-illuminated area of said bulb within an outline of said bulb, whereby to enable the determination, by comparison of said area and said outline, of the degree of synchronization between said shutter and said mechanism and adjusting said mechanism to an extent commensurate with the difference between said illuminated area and the area defined by said outline of said bulb.

7. In a method for determining the degree of synchronization between a photographic shutter and a photoflash-producing mechanism operatively associated therewith, said shutter being fitted with a lens and said mechanism synchronizing the ignition of a photoflash bulb with the opening of the shutter, the steps which comprise, placing a mirror in front of said lens, placing said bulb to one side of said lens, focusing on the focal plane of said lens an image of said bulb reflected from said mirror, actuating said mechanism to ignite the flash bulb and substantially simultaneously to open the shutter, directing light from said ignited flash bulb through the open shutter onto said focal plane, and energizing with said light a phosphor area located at said focal plane so as substantially instantaneously to produce thereon a self-luminous, slowly decaying, focused image of the flash-illuminated area of said bulb within an outline of said bulb, whereby to enable the determination, by comparison of said area and said outline, of the degree of synchronization between said shutter and said mechanism.

8. In a method for determining the degree of synchronization between a photographic shutter and a photoflash-producing mechanism operatively associated therewith, said shutter being fitted with a lens and said mechanism synchronizing the ignition of a photoflash bulb with the opening of the shutter, the steps which comprise, placing said bulb in front of said lens, focusing an image of said bulb on the focal plane of said lens, actuating said mechanism to ignite the flash bulb and substantially simultaneously to open the shutter, directing light from said ignited flash bulb through the open shutter onto said focal plane, and energizing with said light a phosphor area located at said focal plane so as substantially instantaneously to produce thereon a self-luminous, slowly decaying, focused image of the flash-illuminated area of said bulb within an outline of said bulb, whereby to enable the determination, by comparison of said luminous area and said outline, of the degree of synchronization between said shutter and said mechanism.

9. In a method for determining the degree of synchronization between a photographic shutter and a photoflash-producing mechanism operatively associated therewith, said shutter being fitted with a lens and said mechanism synchronizing the ignition of a photoflash bulb with the opening of the shutter, the steps which comprise, focusing an image of said bulb on the focal plane of said lens, actuating said mechanism to ignite the flash bulb and substantially simultaneously to open the shutter, directing light from said ignited flash bulb through the open shutter onto said focal plane, energizing with said light a phosphor area located at said focal plane so as substantially instantaneously to produce thereon a self-luminous, slowly decaying, focused image of the flash-illuminated area of said bulb within an outline of said bulb, and comparing said area and said outline to determine the degree of synchronization between said shutter and said mechanism.

10. In a method for determining the degree of synchronization between a photographic shutter and a photoflash-producing mechanism operatively associated therewith, said shutter being fitted with a lens and said mechanism synchronizing the ignition of an infra-red photoflash bulb with the opening of the shutter, the steps which comprise, focusing an image of said bulb on the focal plane of said lens, exposing to actinic light including waves at the higher end of the visible wavelength band a plate coated with phosphor material of the type substantially instantaneously activated by light and having a slow decay characteristic so as to cause said phosphor to glow uniformly, locating said plate at said focal plane, actuating said mechanism to ignite the flash bulb and substantially simultaneously to open the shutter, directing infra-red light from said ignited flash bulb through the open shutter onto said focal plane, and impressing said infra-red light on said glowing phosphor material so as to produce thereon substantially instantaneously a negative focused image of the flash-illuminated area of said bulb within an outline of said bulb, whereby to enable the determination, by comparison of said area and said outline, of the degree of synchronization between said shutter and said mechanism.

11. In a method for testing the synchronization between a camera shutter and a photoflash-producing mechanism operatively associated therewith to synchronize the ignition of an infra-red photoflash bulb with the opening of the shutter, said shutter being fitted with a lens, the steps which comprise, positioning the photoflash bulb in such relation to said lens and shutter that light from said bulb will pass through said lens and shutter, focusing on the focal plane of said camera an image of said bulb, exposing to light including the shorter wave lengths a sheet of material comprising a phosphorescent photosensitive substance of the type substantially instantaneously activated by such light and having a slow decay characteristic, positioning said sheet of material in the focal plane of said camera, actuating said mechanism to ignite said photoflash bulb and to open said shutter, and directing infra-red light from the ignited photoflash bulb through said lens onto said photosensitive substance to activate said substance so as substantially instantaneously to produce thereon a non-permanent focused image of the illuminated area and the envelope of the ignited photoflash bulb, to enable by inspection of said image the immediate determination of the character and extent of the illuminated area within said envelope, thereby to determine the sense and degree of synchronization between said shutter and said mechanism.

12. In a method for determining the degree of synchronization between a photographic shutter and a photoflash-producing mechanism operatively associated therewith, said shutter being fitted with a lens and said mechanism synchronizing the ignition of an infra-red photoflash bulb with the opening of the shutter, the steps which comprise, illuminating said bulb by visible light external thereto, focusing an image of said bulb on the focal plane of said lens, exposing to light including the shorter wave lengths a plate comprising a photosensitive substance of the printing-out type substantially instantaneously activated by said last mentioned light and having a slow decay characteristic, positioning said plate in said focal plane, actuating said mechanism to ignite the flash bulb and substantially simultaneously to open the shutter, directing infra-red light from said ignited flash bulb through the open shutter onto said photosensitive substance, and substantially instantaneously forming thereon by said infra-red light a non-permanent focused image which represents an illuminated area within an outline of said bulb, whereby to enable the determination, by inspection of the character of said area and comparison of said area and said outline, of the degree of synchronization between said shutter and said mechanism.

HARRY DAVIS SIMONS.

REFERENCES CITED

The following references are of record in the file of this patent:

UNITED STATES PATENTS

| Number | Name | Date |
|---|---|---|
| 2,197,871 | Mendelsohn | Apr. 23, 1940 |
| 2,219,298 | Dashefsky | Oct. 29, 1940 |
| 2,332,587 | Mendelsohn et al. | Oct. 26, 1943 |

FOREIGN PATENTS

| Number | Country | Date |
|---|---|---|
| 509,308 | Great Britain | July 11, 1939 |

OTHER REFERENCES

"The Camera" for January 1943; pp. 32 to 35. (Copy in Scientific Library, U. S. Patent Office.)